Patented Nov. 15, 1938

2,136,790

UNITED STATES PATENT OFFICE 2,136,790

ABSORPTION REFRIGERATION

Joseph Fleischer, East Alton, Ill., assignor to Servel, Inc., New York, N. Y., a corporation of Delaware No Drawing. Application October 18, 1937, Serial No. 169,643

7 Claims. (Cl. 252—5)

This invention relates to refrigeration, and more particularly to chemical working fluids for use in absorption refrigerating machines.

The importance of absorption refrigeration machines has steadily increased in recent years, mainly because of the fact that machines of this type require no moving parts in their operation, so that their operation entails no wear in the refrigerating apparatus and is free of noise and vibration, which are two distinct advantages over the compression type of refrigerating machinery. Furthermore, absorption refrigerators can be readily adapted to the use of illuminating gas as fuel, whereby the cost of operation can be rendered cheaper, in most localities, than that of electrically operated compression refrigerators.

Refrigeration is generally produced in an absorption refrigerating machine by the evaporation of a liquid refrigerant at a low pressure of the refrigerant vapor. The refrigerant vapor is absorbed in an absorbent material, from which it is later liberated at a higher pressure by the application of heat. The refrigeration cycle is completed by allowing the liberated vapors to condense and evaporate again. There are two types of absorption refrigerating machinery, continuous and intermittent; the former type operates continuously, the evaporation of the refrigerant taking place in the evaporator, the absorption of the refrigerant vapor occurring in the absorber, the liberation of the refrigerant vapor occurring in the generator, and the condensation of the refrigerant vapor being carried out in the condenser; in the intermittent type, the same vessel generally serves alternately as the generator and absorber—heat is first applied to the generator, liberating refrigerant vapor which is then allowed to condense in the condenser and to collect in the evaporator; the generator is then caused to act as the absorber by cooling it, whereby the absorbent material is caused to absorb the refrigerant vapor, causing the liquid refrigerant in the evaporator to boil at a low pressure, thereby absorbing heat from the evaporator and its surroundings. The absorbent material and the refrigerant are termed the working fluid of an absorption refrigerating machine. The absorbent material may be either a solid or a liquid, but only the liquid absorbents are readily adapted for use in a continuous absorption machine.

The most commonly used working fluid in absorption refrigerating machinery, in which the absorbent material is a liquid, is the combination of ammonia as refrigerant and water as absorbent. However, this working fluid does possess some disadvantageous features; it is corrosive to most metals commonly used in the construction of refrigerating machinery, and secondly, water is sufficiently volatile so that the vapor liberated in the generator contains an appreciable amount of water vapor, which must be separated from the ammonia vapor before the latter is condensed, since otherwise, water would collect in the evaporator where it would eventually freeze and stop the operation of the refrigerator. The separation of water vapor from the ammonia vapor is generally carried out in an apparatus called a rectifier or analyzer and the process is known as rectification. The necessity for rectifying the vapor liberated at the generator is unquestionably a disadvantage since it entails a further complication of the refrigerating apparatus, and also because the operating efficiency of the refrigerator is thereby reduced. This decrease in efficiency is due to the fact that the liquid water which is condensed in the rectifier is saturated with ammonia; the heat expended in the generator to liberate the ammonia thus dissolved is wasted, since this ammonia does not reach the evaporator and therefore, produces no useful refrigerating effect.

An object of my invention is to make available for use in absorption refrigerating machines a new type of working fluid which is non-corrosive and in which the absorbent liquid is sufficiently non-volatile to eliminate the necessity of having a rectifier for condensing absorbent vapor from the vapors liberated in the generator. The working fluids which I provide include a low-boiling organic compound, containing carbon, hydrogen and oxygen,—preferably containing only these elements—and characterized by an (—OR) group linked to a carbon atom where R is an aliphatic hydrocarbon radical, as a refrigerant and a high-boiling halogenated derivative of an aliphatic hydrocarbon as an absorbent. More specifically, as refrigerants I provide ethers and esters with normal boiling points below 65° C., and as absorbent materials liquid halogenated derivatives of aliphatic hydrocarbons which contain a —CHX$_2$ group and which have normal boiling points above 100° C.—X representing a halogen atom—the molecules of which contain hydrogen, carbon and halogen atoms, and more especially consist only of these atoms.

If the working fluid in an absorption refrigerating machine is to produce efficient and practical results, it must include an absorbent capable of liberating and absorbing a large amount of refrigerant per unit volume of absorbent. In order to do this, the solutions of the refrigerant in the absorbent must display large negative deviations from Raoult's law; in other words, the vapor pressures of the refrigerant from solutions of the refrigerant in the absorbent must be considerably lower than the vapor pressures calculated by means of Raoult's law.

I have found that solutions of ethers and/or esters, as above specified, in liquid halogenated derivatives of aliphatic hydrocarbons which contain the ($-CHX_2$) group, which boil above 100° C., and, desirably, consist only of hydrogen, carbon, and halogen atoms, display large negative deviations from Raoult's law. Furthermore, I have found that such ethers and esters are absorbed in and liberated from such liquid absorbents in amounts sufficient to produce practical and efficient refrigeration.

As a specific example of my invention, a working fluid may consist of dimethyl ether, having the formula $CH_3OCH_3$, as the refrigerant, and tetrachloroethane having the formula

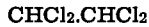

as the absorbent.

The preferred working composition of this working fluid is twenty-two percent by weight of dimethyl ether, although a variation of plus or minus five percent of dimethyl ether would not seriously impair the efficiency of the working fluid.

As a second example of my invention, a working fluid may consist of methyl formate, having the formula $HCOOCH_3$, as the refrigerant, and tetrachloroethane, having the formula $CHCl_2.CHCl_2$, as the absorbent. The preferred working composition of this working fluid is twenty, plus or minus five percent, by weight of methyl formate.

Other ethers and esters, of the composition and properties specified above, may likewise serve as refrigerant, and other halogenated derivatives of aliphatic hydrocarbons which contain the ($-CHX_2$)

group which boil above 100° C. and which contain hydrogen, carbon and halogen atoms may serve as absorbent, e. g. penta chloroethane $CCl_3.CHCl_2$.

Furthermore, mixtures of different ethers, of the kind specified, or of different esters, of the kind specified, e. g., methyl ethyl, ethyl, methyl propyl, ethyl propyl, methyl isopropyl, isopropyl, ethyl isopropyl and vinyl ethers, and ethylene oxide, propylene oxide, methylal, furane, methyl acetate and ethyl formate, or of such ether or ethers with such ester or esters may serve as refrigerant, and a mixture of different halogenated derivatives of aliphatic hydrocarbons which contain the ($-CHX_2$) group which boil above 100° C. and contain hydrogen, carbon and halogen atoms, such as trichloropropane

pentachloropropane ($Cl_2HC.CHCl.CHCl_2$), tetrachloro normal butane ($Cl_2HC.CH_2.CH_2.CHCl_2$), hexachloro normal butane

and hexachloroiso-butane

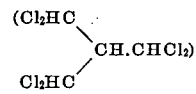

may serve as absorbent.

While I have given certain specific examples of working fluids, it should be understood that my invention includes any working fluid containing an ether or ester boiling below 65° C. coming within composition and properties specified as a refrigerant and a halogenated derivative of an aliphatic hydrocarbon which contains the

group, which boil above 100° C. and which contains hydrogen, carbon and halogen atoms as an absorbent. It should be further understood that these working fluids are adaptable for use in either the continuous or intermittent type of absorption refrigerating machine.

Thus, I have disclosed a number of working fluids for use in absorption refrigerating machinery having practical advantages over all working fluids now in use.

This application is a continuation in part of my copending application Serial No. 693,684 filed October 14, 1933.

Having described my invention what I claim as new and desire to secure by Letters Patent is:

1. A working fluid for absorption refrigerating machines, comprising as a refrigerant a member of the group consisting of ethers and esters, said compounds having a boiling point below 65° C., and as an absorbent a halogenated aliphatic hydrocarbon containing carbon, hydrogen and halogen and a $-CHX_2$ group (X representing a halogen atom), and having a boiling point above 100° C.

2. A working fluid for absorption refrigerating machines, comprising as a refrigerant a member of the group consisting of ethers and esters, said compounds having a boiling point below 65° C., and as an absorbent a chlorinated aliphatic hydrocarbon containing carbon, hydrogen and chlorine and a $-CHCl_2$ group and having a boiling point above 100° C.

3. A working fluid, as called for in claim 1, in which the refrigerant consists of an ether.

4. A working fluid, as called for in claim 1, in which the refrigerant consists of an ester.

5. A working fluid for absorption refrigerating machines comprising dimethyl ether as refrigerant and pentachloroethane as absorbent.

6. A working fluid for absorption refrigerating machines comprising dimethyl ether as refrigerant and tetrachloroethane as an absorbent.

7. A working fluid for absorption refrigerating machines comprising methyl formate as refrigerant and tetrachloroethane of the probable formula $CHCl_2.CHCl_2$ as absorbent.

JOSEPH FLEISCHER.